(12) United States Patent
Dahiya

(10) Patent No.: US 12,504,971 B2
(45) Date of Patent: Dec. 23, 2025

(54) ENTERPRISE APPLICATION INTEGRATION LEVERAGING NON-FUNGIBLE TOKEN

(71) Applicant: Bank of America Corporation, Charlotte, NC (US)

(72) Inventor: Nisha Dahiya, Majlis Park (IN)

(73) Assignee: Bank of America Corporation, Charlotte, NC (US)

(*) Notice: Subject to any disclaimer, the term of this patent is extended or adjusted under 35 U.S.C. 154(b) by 184 days.

(21) Appl. No.: 18/402,084

(22) Filed: Jan. 2, 2024

(65) Prior Publication Data

US 2025/0217752 A1 Jul. 3, 2025

(51) Int. Cl.
*G06F 8/71* (2018.01)
*G06F 8/10* (2018.01)
*H04L 9/00* (2022.01)
*H04L 9/32* (2006.01)

(52) U.S. Cl.
CPC .............. *G06F 8/71* (2013.01); *G06F 8/10* (2013.01); *H04L 9/3236* (2013.01); *H04L 9/50* (2022.05)

(58) Field of Classification Search
CPC ....... H04L 9/50; H04L 9/3247; H04L 9/3236; G06F 8/71; G06F 8/10
See application file for complete search history.

(56) References Cited

U.S. PATENT DOCUMENTS

| | | | |
|---|---|---|---|
| 11,075,891 B1 | 7/2021 | Long et al. | |
| 12,386,850 B1* | 8/2025 | Sengupta | G06F 16/258 |
| 2020/0160289 A1 | 5/2020 | Mahajan et al. | |
| 2020/0242105 A1 | 7/2020 | Rich et al. | |
| 2021/0256070 A1 | 8/2021 | Tran et al. | |
| 2022/0040557 A1 | 2/2022 | Tran | |
| 2022/0173893 A1 | 6/2022 | Basu et al. | |
| 2022/0207119 A1 | 6/2022 | Andon et al. | |
| 2024/0020100 A1* | 1/2024 | Levitt | G06F 8/35 |

FOREIGN PATENT DOCUMENTS

WO  WO-2024049796 A1 * 3/2024 ........... G06Q 10/067

OTHER PUBLICATIONS

Wang, Leveraging Machine Learning to Improve Software Reliability, PhD diss., University of Waterloo (2018) (Year: 2018).*

* cited by examiner

*Primary Examiner* — Charles Guiliano
(74) *Attorney, Agent, or Firm* — Banner & Witcoff, Ltd.

(57) ABSTRACT

Solutions for integration and ongoing management of enterprise applications operating in a networked environment are disclosed. An AI transformer extracts, transforms, and manages integration point information from various sources, including documents, UMLs, and other system diagrams. Instead of relying on traditional documentation, the invention utilizes blockchain-based NFTs (non-fungible tokens) to store and manage integration point information. NFTs are created using smart contracts, which define the rules and conditions for the NFT. A metadata engine prepares metadata for generating the Integration Point NFTs. An NFT manager creates the integration point NFTs. A change analyzer determines the impact of changes to integration points on different applications and functionalities. A release compliance component is integrated with DevOps and is responsible for ensuring that integration point changes are incorporated into all impacted applications according to the release defined in the NFT.

2 Claims, 6 Drawing Sheets

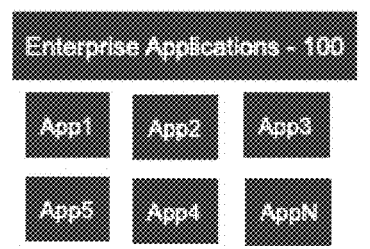
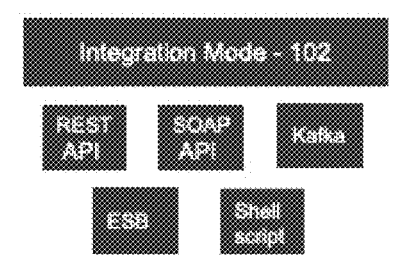
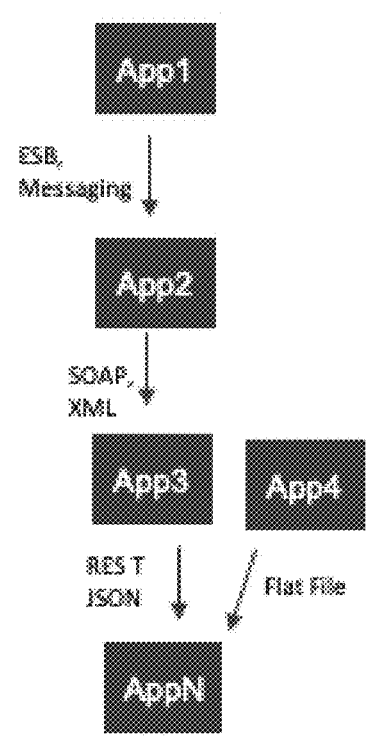
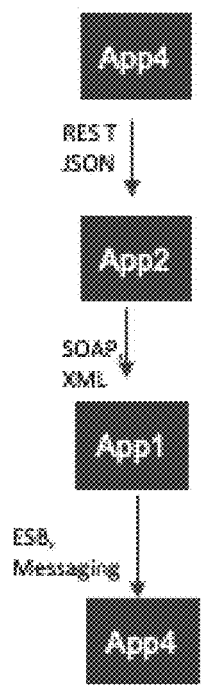
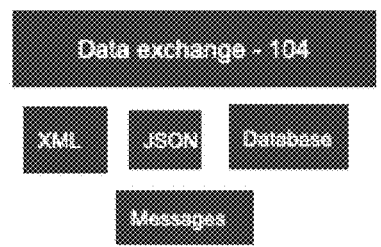
FIG. 1A     FIG. 1B     FIG. 1C

ENTERPRISE APPLICATION INTEGRATION LEVERAGING NON-FUNGIBLE TOKEN

TECHNICAL FIELD

The present disclosure relates to data processing: software development, installation, and management and, more particularly, to systems, methods, and apparatus for management of enterprise applications and integration thereof based on changes in functionality and integration points using non-fungible tokens (NFTs).

DESCRIPTION OF THE RELATED ART

In large enterprises, there are numerous applications that are interconnected to provide specific functionalities, such as bank account transfers, cash withdrawals, authentication, authorization, payments, settlements, messaging, and printing. These applications work in tandem to provide seamless user experiences and ensure accurate data exchange.

The integration of these diverse enterprise applications is achieved through various mechanisms, including REST APIs, SOAP APIs, file transfers, and database table changes. Each application has a specific set of data that it sends to other applications. This data exchange is documented using documents, UMLs, and flow diagrams.

However, over time, the information exchange between applications and its modes can change. These changes are often documented in separate documents, which may not always be updated promptly. This leads to discrepancies between the documented information and the actual implementation.

When there is a change in functionality or application integration points, solution architects, business users, and development teams need to spend significant time understanding the current situation and identifying the impacted applications. This can be a time-consuming and error-prone process, especially for complex enterprise systems with numerous interconnected applications.

The lack of a centralized and up-to-date repository of integration information can lead to several negative consequences, including: (a) delayed impact assessment: identifying the impacted applications when there is a change in functionality or integration points becomes a time-consuming and error-prone process; (b) inefficient change management: managing changes to application integrations becomes more difficult as it's challenging to track and propagate these changes across the interconnected applications; (c) increased risk of errors: reliance on outdated documentation increases the risk of errors and inconsistencies in data exchange between applications; and (d) reduced agility: the inability to quickly understand and adapt to changes in application integrations hinders an organization's ability to respond promptly to market demands and customer needs.

Thus, traditional integration point management on manual analysis of documentation to understand the relationships between applications and the data they exchange. This process is time-consuming, error-prone, and difficult to scale.

Hence there is a long felt and unsatisfied need to provide systems and processes to manage integration of enterprise applications, provide analysis of changes in functionality and/or integration points on different applications, and integrate with software development (Dev) and IT operations (Ops) to shorten the software development lifecycle and provide continuous delivery of software as well as updating of software as new applications, software versions, and functionality are added.

SUMMARY OF THE INVENTION

In accordance with one or more arrangements of the non-limiting sample disclosures contained herein, solutions are provided to address one or more of the shortcomings in the field of integration and ongoing management of enterprise applications operating in a networked environment by inter alia: utilizing an artificial intelligence (AI) transformer to address the challenge of maintaining up-to-date integration information in enterprise systems, which serves as a central processing hub for extracting and transforming integration point information from various sources, including documents, unified modeling language systems and models (UMLs), and other system diagrams; and by leveraging non-fungible tokens (NFTs), which are unique digital assets that exist on a blockchain and cannot be replicated. They are like a certificate of ownership for a digital asset, proving that you are the original creator or owner of that asset. NFTs can be used to represent application integration points and provide benefits of: (a) uniqueness: each NFT is a unique and non-interchangeable token, unlike cryptocurrencies, which are fungible, meaning that one unit is interchangeable with another; (b) immutability: NFTs are stored on a blockchain, which is a secure and transparent distributed ledger. this means that once an NFT is created, its ownership history and other metadata are permanently recorded and cannot be altered; and (c) verifiability: NFTs can be easily verified and tracked on the blockchain, ensuring that their authenticity and ownership are always verifiable. NFTs are created using smart contracts, which are self-executing contracts deployed on the blockchain. These contracts define the rules and conditions for the NFT, such as who owns it, how it can be transferred, and what rights it grants to the owner.

The transformer component extracts integration point information from various sources, including JIRA tickets, confluence pages, and artifactory repositories. This information can include details about application interactions, data exchange patterns, and integration protocols.

Once extracted, the transformer component parses the unstructured information into a structured format. This involves identifying relevant data elements, extracting key values, and organizing the information in a consistent manner.

The transformer component applies intelligent transformation techniques to transform the parsed information into concise and meaningful integration metadata. This metadata provides a clear and structured representation of the integration points, facilitating its utilization by the metadata engine.

The transformer component interacts with the UI and integration controller to receive input from application owners. This input typically includes the location of artifactory repositories, JIRA tickets, and confluence pages.

The transformer component utilizes DevOps tools, and provides communication therewith, to extract relevant documents, UMLs, and other system diagrams. These diagrams provide contextual information about the application integrations.

The transformer component provides the transformed integration metadata to the metadata engine. The metadata engine utilizes this metadata to generate comprehensive integration reports and maintain a centralized repository of up-to-date integration information.

A metadata engine is responsible for preparing the metadata that is required for generating the Integration Point NFTs. This metadata includes information about the producer application, the functionalities impacted, the consumer application, the integration version, the data that is exchanged, and the release details. This information is then sent to the NFT Manager for NFT creation.

The NFT Manager is responsible for creating the Integration Point NFTs. An NFT is created for each integration point and for each version of the integration point. The NFTs are owned by the producer application that is publishing the integration point. The NFT Manager is also responsible for managing the NFTs and providing data to the Change Analyzer and Release Compliance components.

The transformer component streamlines the process of gathering, transforming, and managing integration point information. By effectively extracting, parsing, and intelligently transforming information from diverse sources, it contributes significantly to the following benefits:

Enhanced Accuracy: The transformer component ensures the accuracy of integration information by extracting it directly from authoritative sources and applying rigorous parsing and transformation techniques.

Reduced Manual Effort: The transformer component automates the process of extracting and transforming integration information, significantly reducing the manual effort required from application owners and IT teams.

Improved Data Quality: The transformer component contributes to improved data quality by standardizing and structuring integration information, making it easier to analyze and utilize.

Increased Agility: The transformer component facilitates faster impact assessment and change management by providing a centralized and up-to-date repository of integration information.

Reduced Risk of Errors: The transformer component helps minimize errors by ensuring that integration information is consistent across various documents and system diagrams.

A change analyzer is responsible for analyzing the impact of changes to integration points on different applications and functionalities. This is done whenever there is a business or regulatory need for a change, or whenever there is a change to an integration point due to a technology change. The change analyzer gets the change request analysis from business users or architects through the UI and Integration Controller modules. It then processes and analyzes the impact of the change request on different applications.

A release compliance component is integrated with DevOps and is responsible for ensuring that integration point changes are incorporated into all impacted applications according to the release defined in the NFT. An application release branch cannot be deployed until it complies with the NFT requirements.

In view of the foregoing, the NFT-Based Integration Point Management systems and processes disclosed herein provide a unique way to manage integration points using NFTs (non-fungible tokens). NFTs are a type of digital asset that are stored on a blockchain. Each NFT is unique and cannot be replicated. In this invention, each integration point is represented by an NFT. The NFT contains all of the relevant metadata about the integration point, such as the producer application, the consumer application, the data that is exchanged, and the version of the integration point.

The inventive approaches disclosed herein have several advantages over traditional integration point management such as, for example, (a) Automate impact analysis: The system can automatically analyze the Integration point NFTs for impact analysis for any Functionality change or integration point change. This saves time and improves accuracy. (b) Version control: Each integration point has its own NFT, which makes it easy to track changes over time. For each version change a secondary NFT can be added and associated with Primary NFT. (c) Functionality based NFT: Functionality Based NFT define which give all the integration points details based on functionality. (D) DevOps integration: The system can be integrated with DevOps to ensure that applications are compliant with the integration points defined in the NFTs. This helps to prevent deployments that would break existing integrations. Overall, this invention provides a unique and innovative way to manage integration points. It has the potential to save time, improve accuracy, and make integration management more scalable.

Sample key aspects of the inventions disclosed herein include the following. First, Unconventional Use of NFTs for Enterprise Integration Management. This is the unconventional approach to managing enterprise integration systems. Instead of relying on traditional documentation, the invention utilizes NFTs (non-fungible tokens) to store and manage integration point information. This shift from physical documents to blockchain-based NFTs represents a significant departure from conventional methods and introduces several unique advantages.

Second is Accuracy and Timeliness of Integration Point Data. The NFT-based approach ensures the accuracy and timeliness of integration point data. By storing integration details directly within the NFTs, the system maintains a single source of truth, eliminating discrepancies and outdated information. This centralized repository facilitates quick access to the latest integration point information, enabling rapid impact analysis in response to changes.

Third is Enhanced Integration Management and Reduced Production Issues. The invention's NFT-based approach improves overall enterprise integration management, leading to a reduction in production issues and a shorter time to restore. By providing accurate and readily available integration point information, the system empowers stakeholders to make informed decisions and proactively address potential problems. This proactive approach minimizes disruptions and downtime, ensuring a smoother and more efficient integration process.

Fourth is Improved Integration Change Management and Time to Market. The invention's NFT-based approach also enhances integration change management, leading to a faster time to market. By streamlining the change management process and providing clear visibility into integration point dependencies, the system accelerates the implementation of new integrations and updates. This improved efficiency reduces the overall time required to introduce new features or functionality, accelerating the delivery of products and services to market.

In summary, invention aspects of this disclosure stem from innovative integration of NFT technology into enterprise integration management. By utilizing NFTs to store and manage integration point data, the invention addresses the limitations of traditional documentation-based approaches, providing a more accurate, time-efficient, and secure method for managing enterprise integrations.

Considering the foregoing, the following presents a simplified summary of the present disclosure to provide a basic understanding of various aspects of the disclosure. This summary is not limiting with respect to the exemplary aspects of the inventions described herein and is not an extensive overview of the disclosure. It is not intended to identify key or critical elements of or steps in the disclosure or to delineate the scope of the disclosure. Instead, as would be understood by a personal of ordinary skill in the art, the following summary merely presents some concepts of the disclosure in a simplified form as a prelude to the more detailed description provided below. Moreover, sufficient written descriptions of the inventions are disclosed in the specification throughout this application along with exemplary, non-exhaustive, and non-limiting manners and processes of making and using the inventions, in such full, clear, concise, and exact terms to enable skilled artisans to make and use the inventions without undue experimentation and sets forth the best mode contemplated for carrying out the inventions.

In some arrangements, a method for managing integration points in an enterprise environment utilizing non-fungible tokens, can comprise one or more steps, such as, for example: extracting, by an artificial intelligence (AI) transformer, integration point information for enterprise applications from unified modeling language (UML) software models, integration documents, functionality descriptions, integration protocols, and data exchange patterns, said integration point information in an unstructured format; parsing, by a metadata engine, the integration point information into a structured format; generating, by the metadata engine based on the integration point information, an application interaction graph and application integration metadata; transmitting, by the metadata engine to an enterprise integration management platform, the application interaction graph and the application integration metadata; generating, by a non-fungible token (NFT) manager based on the application interaction graph and the application integration metadata, integration point NFTs for each integration point for the enterprise applications, wherein each said integration point NFTs is a smart integration contract and is unique to each version of said enterprise applications, said integration point NFTs including: producer application details that exposes available services, consumer application details, information and data type details regarding what is exchanged for input and output for integration, functionality impact details, integration versioning details, release date details, and timestamps; storing, by a blockchain consensus network, the integration point NFTs in blockchain storage; detecting, by a change analyzer in the enterprise integration management platform, any changed application in any of said enterprise applications; performing, by the change analyzer based on the changed application and the integration point NFTs, an impact analysis for each said integration point for the enterprise applications to determine consequences resulting from the changed application; updating, by the NFT manager, the integration point NFTs based on the impact analysis; performing, by the blockchain consensus network, consensus processing on the integration point NFTs that were updated; storing, by the blockchain consensus network in the blockchain storage, the integration point NFTs that were updated if a consensus was reached during consensus processing; verifying, by a release compliance manager, that the changed application complies with the smart integration contract for the integration point NFTs; and preventing, by the release compliance manager, deployment of the changed application until compliance with the smart integration contract is verified.

In some arrangements, one or more various steps or processes disclosed herein can be implemented in whole or in part as computer-executable instructions (or as computer modules or in other computer constructs) stored on computer-readable media. Functionality and steps can be performed on a machine or distributed across a plurality of machines that are in communication with one another.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a', 'an', and 'the' include plural referents unless the context clearly dictates otherwise.

BRIEF DESCRIPTION OF DRAWINGS

FIGS. 1A-C depict technical diagrams and functionality examples in accordance with one or more aspects of this disclosure as they relate to integration of enterprise applications.

DETAILED DESCRIPTION

Figure 2:
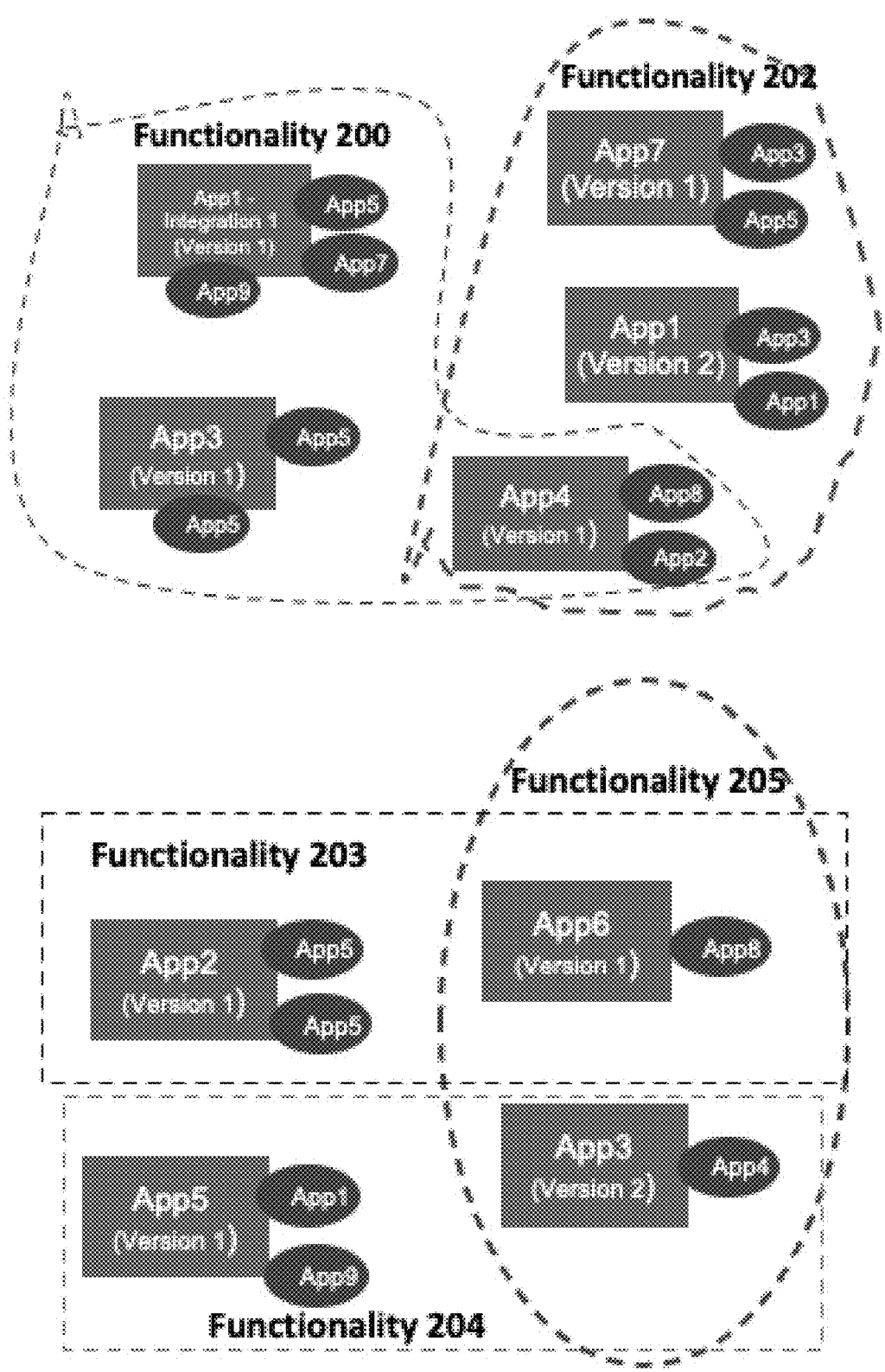
FIG. 2 depicts an NFT environment in accordance with one or more aspects of this disclosure as they relate to integration of enterprise applications.

In the following description of the various embodiments to accomplish the foregoing, reference is made to the drawings, which form a part hereof, and in which is shown by way of illustration, various embodiments in which the disclosure may be practiced. It is to be understood that other embodiments may be utilized, and structural and functional modifications may be made. It is noted that various connections between elements are discussed in the following description. It is noted that these connections are general and, unless specified otherwise, may be direct or indirect, wired, or wireless, and that the specification is not intended to be limiting in this respect.

As used throughout this disclosure, any number of computers, machines, or the like (referenced interchangeably herein depending on context) can include one or more general-purpose, customized, configured, special-purpose, virtual, physical, and/or network-accessible devices as well as all hardware/software/components contained therein or used therewith as would be understood by a skilled artisan, and may have one or more application specific integrated circuits (ASICs), microprocessors, cores, executors etc. for executing, accessing, controlling, implementing etc. various software, computer-executable instructions, data, modules, processes, routines, or the like as explained below. References herein are not considered limiting or exclusive to any type(s) of electrical device(s), or component(s), or the like, and are to be interpreted broadly as understood by persons of skill in the art. Various specific or general components, machines, or the like are not depicted in the interest of brevity or discussed herein in detail because they would be known and understood by ordinary artisans.

Software, computer-executable instructions, data, modules, processes, routines, or the like can be on tangible computer-readable memory (local, in network-attached storage, be directly and/or indirectly accessible by network, removable, remote, cloud-based, cloud-accessible, etc.), can be stored in volatile or non-volatile memory, and can operate autonomously, on-demand, on a schedule, spontaneously, proactively, and/or reactively, and can be stored together or distributed across computers, machines, or the like including memory and other components thereof. Some or all the foregoing may additionally and/or alternatively be stored similarly and/or in a distributed manner in the network accessible storage/distributed data/datastores/databases/big data/blockchains/distributed ledger blockchains etc.

By way of non-limiting disclosure, depict technical diagrams and functionality examples in accordance with one or more aspects of this disclosure as they relate to integration of enterprise applications.

In any given enterprise, the enterprise will be executing a variety of applications to perform various functionalities. In FIG. 1A, enterprise applications 100 can include any number of applications such as App1, App2, App3, App4 . . . AppN. Various integration modes 102 may be used for the applications such as, for example, REST API, SOAP API, Kafka, ESB, shell script, etc. Some applications may support one or more of these integration modes whereas others may support different integration modes. Further, different applications may support different forms of data exchanges 104 such as, for example, XML, JSON, database, messages, etc. Again, different applications may only support one or more types and this may vary from application to application.

Any given enterprise will have a variety of applications including enterprises for a single functionality, for example, banking. Consequently, for ATM withdrawals, there could be a scenario in which multiple applications collaborate to fulfill the requirement for one functionality provided by the bank as depicted in functionality 106 in FIG. 1B. In this example, App1 flows serially to App2 using ESB for integration and messaging for data exchange. App2 flows serially to App3 using SOAP for integration and XML for data exchange. App3 and App4 then operate in parallel and flow to AppN respectively using REST and JSON for App3 to AppN and a flat file for App4 to AppN.

This is similarly true for functionality 108 for account transfers as shown in FIG. 1C. For the account transfer example, the flow could be from App4 to App2 to App1 to App4 in series using the depicted integration modes and data exchanges that overlap in compatibility between adjacent apps in the flow(s).

When these applications integrate and communicate with one another, there are various integration modes available, with which the applications are integrated with one another.

There could be the REST API, which is related to API Kafka, and where messaging occurs via the ESP shell script. Anything is possible. For example, in a database, some application could insert something, and that database could be widely used, while information is being read from the database, data may be transmitted or retrieved. it may send the information. The same is true for data exchange. As a result, data is exchanged in various formats. It could be the XML in some cases. In some cases, JSON databases are accessed via messages. As a result, different types of data could be exchanged using the XML format. And that is the mode of integration for that particular exchange.

In order to complete one functionality, different application participants may be required. That is the essence of the concept. Typically, an application has its integration document, in which they will provide all applicable information.

Different enterprise applications are integrated with one another using various integration mechanisms such as REST, SOAP, and file transfer. This application has a set of information that is sent from one application to another.

To capture these integration details, documents such as UML and flow diagrams were created. But, as time passes, these integration documents must be updated because changes occur in the applications and how they integrate, which is required by the industry. Previously, SOAP was very common, but now REST is.

For reference, UML refers to Unified Modeling Language, which is a general-purpose, standardized language for modeling software systems. It provides a graphical notation for depicting a wide variety of software concepts, including classes, objects, attributes, operations, relationships, and collaborations. UML diagrams can be used to model both the static structure of a system and its dynamic behavior.

In some scenarios, an application may have previously used SOAP for integration but now, after various enterprise changes, Kafka may be required. As a result, there could be several scenarios. When this happens, documents are not always updated to reflect the changes and problems occur. As a result, analyzing the impact for the functionality change, as well as the various applications involved and their integration point(s) is problematic.

Obtaining this information takes longer than the actual change that must be made. Consequently, solution architects, business user development teams, and the like must spend significant time analyzing the situation, identifying the affected applications and data types, etc. If information in documents is not current or has not been updated, then impact analysis must be performed. This may result in detailed system analysis, code review, and troubleshooting.

By way of non-limiting disclosure, FIG. 2 depicts an NFT environment in accordance with one or more aspects of this disclosure as they relate to integration of enterprise applications in order to illustrate how different applications can interact with one another.

As an example, whenever an application publishes any web service/batch job where data is sent, then a NFT can be created that is owned by that application. This NFT can contain the metadata regarding the application details, information metadata which is sent/exchanged, list of all other application which consumes the information meta, functionality metadata (business functionality for which application publish the data). Relationships may be one to one or one to many as shown in the figure as pertains to various applications and versions thereof as well as applications that are required for different functionalities such as functionality 200-205.

Because application integration details are in the form of NFT, if there is a change, an analysis can be performed to determine who is affected. The owner of this integration point is the application that has the impact and publishes it. As a result, they are in charge of updating. If there is an update or change, then all of the systems will be aware of the change for analysis purposes because the NFT is in an accessible blockchain and thus known. Hence, the application can be searched for functionality one, and the NFTs that are participating in that functionality can be identified along with the applications that participate in that functionality. Thus, the application detail, the information metadata that is sent, and a list of all the other applications that consume the information metadata, can be utilized including functionality metadata, which describes the functionality. As a result, one application may be involved in more than one functionality, and there could be one to many relationships between the application and functionality. This means that a single application can participate in multiple functions. Similarly, the application, the application's producer, is actually exposing its integration point. It refers to the relationship between an application and another application. There could be one to many consumers for one application. Further, there may be different integration points in different integrations.

Figure 3:
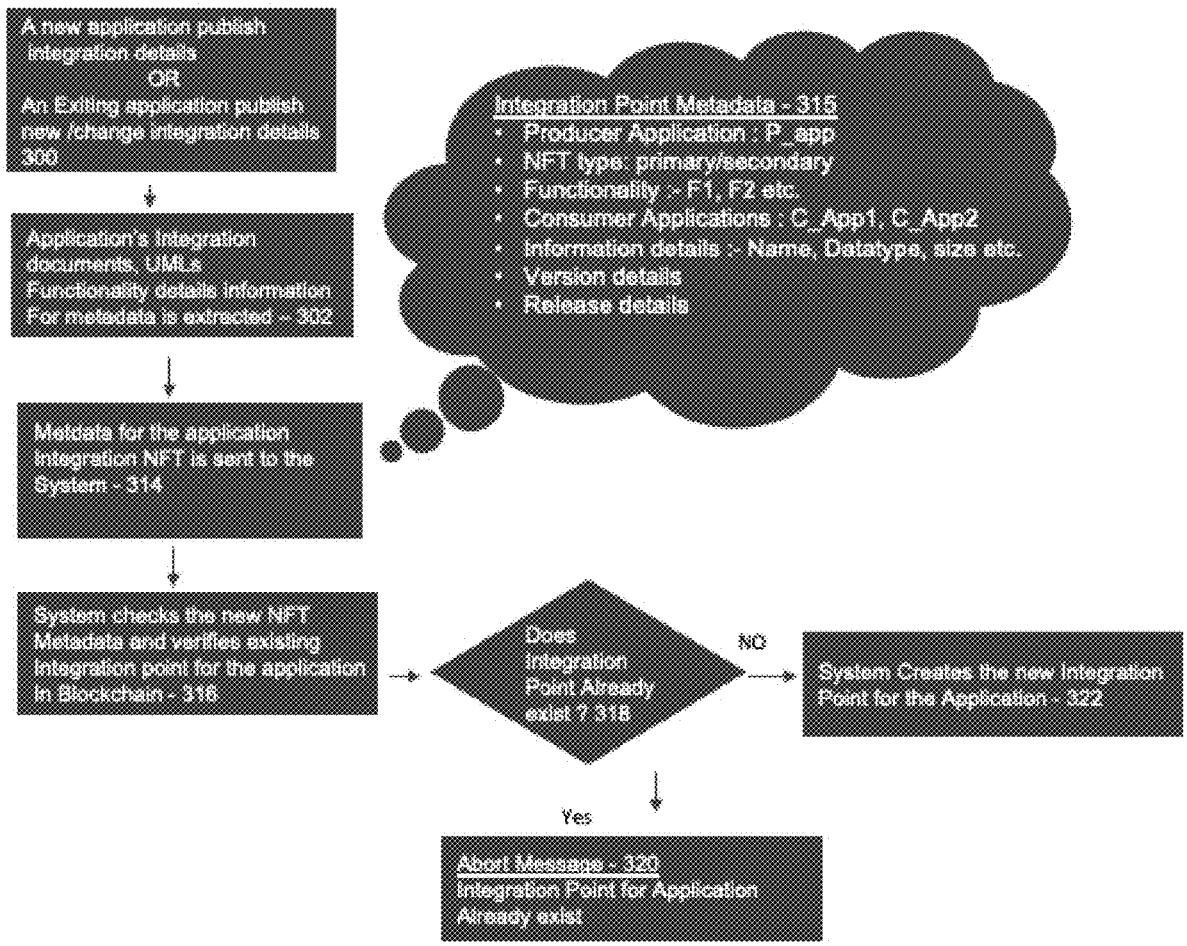
FIG. 3 depicts application integration point hashcode generation flow in accordance with one or more aspects of this disclosure as they relate to integration of enterprise applications.

By way of non-limiting disclosure, FIG. 3 depicts application integration point hash code generation flow in accordance with one or more aspects of this disclosure as they relate to integration of enterprise applications.

In 300, a new application publishes integration details or an existing application publishes new/change integration details. In 302, an application's integration documents, UMLs, functionality details information for metadata is extracted.

In 314, metadata for the application integration NFT is sent to the system. As shown in 315, integration point metadata includes: Producer Application: P_app, NFT type: primary/secondary, Functionality:—F1, F2 etc., Consumer Applications: C_App1, C_App2, Information details:— Name, Datatype, size etc., Version details, Release details, etc. In 316, the system checks the new NFT metadata and verifies existing integration point(s) for the application in blockchain.

In 318, a determination is made as to whether an integration point already exists. If not, the system creates the new integration point for the application 322. Otherwise, if it does exist, an error condition is present and an abort message is presented because the integration point for the application already exists, as illustrated in 320.

Thus, the flow depicted in FIG. 3 consists of application integration points that form the hash code generation flow. As shown and briefly referenced above, there could be two scenarios, such as in this scenario where a new application published an integration point, implying that the new application is onboarding to this NFT environment. Alternatively, the existing application may publish new changes to the integration chains. As a result, the integration point could shift.

So, in that case, application integration documents and UML functionality detail and formation are extracted, and metadata is extracted from this one. Because whatever the enterprise has already in the form of documentation is ultimately participating in the UML.

As a result, the enterprise will extract the metadata that will be used to create the NFT. The extraction will take place from all of these documents, as well as whatever applications the enterprise has for that purpose.

The system is then sent metadata for the application integration NFT. Now, the metadata that we are discussing is the NFTs integration point metadata, which will include information such as the producer application could be primary and secondary NFT types.

The reason for primary and secondary is that if one NFT is created, it should be followed by another NFT. Another NFT may be created as a result of a change in the version, or as a result of any change that occurs.

However, the primary, as well as all NFTs created for that application, will be aligned. They will be treated as a secondary NFT and will be aligned with the primary NFT. This ensures that the information is complete, and nothing is missing, and the enterprise can trace it back and identify it.

Basically, the NFT is of two types (i.e., primary and secondary NFTs). When first onboarding occurs for any application, integration details are published. As a result, it becomes the primary for any changes, before becoming a secondary and being assigned to the NFT. The functionality details metadata then includes the functionality details as well as the fact that it is participating in functionality 1, 2, and so on. The consumer application is likewise. As a result, a consumer application could have a consumer list for this application as well. Next metadata includes information detail, which is that name if there is an addition. It means that two things must be added to the first. There can be more than two, but we need to know the name, data type, and size of this one.

Release detail is critical because it can be seen what happens with this integration type of application or changes occur. So the application where the change is taking place will have the release date. Details will be published by this time. And the other applications that are integrating must either upgrade or integrate with them in that release.

That is an agreement that is formed as of that time. The new version will be released as of the release date. Perhaps one of the five applications covered by the contract will be upgraded to the latest version by the date, because it is being published.

For the others, the same contract can be used, which allows existing NFT details to be kept while adhering to the rules and integrating with DevOps. That is why release information is included as well. What changes have occurred in what release can be tracked and traced. Many different variables can be tracked, mapped, and predicted based on how this metadata is used.

When the metadata for the application integration is sent to the system, the system checks the new NFT metadata and verifies the existing integration point for the application in the blockchain because it must determine whether this is new or existing and whether it will become secondary or primary. So that validation is required.

Figure 4:
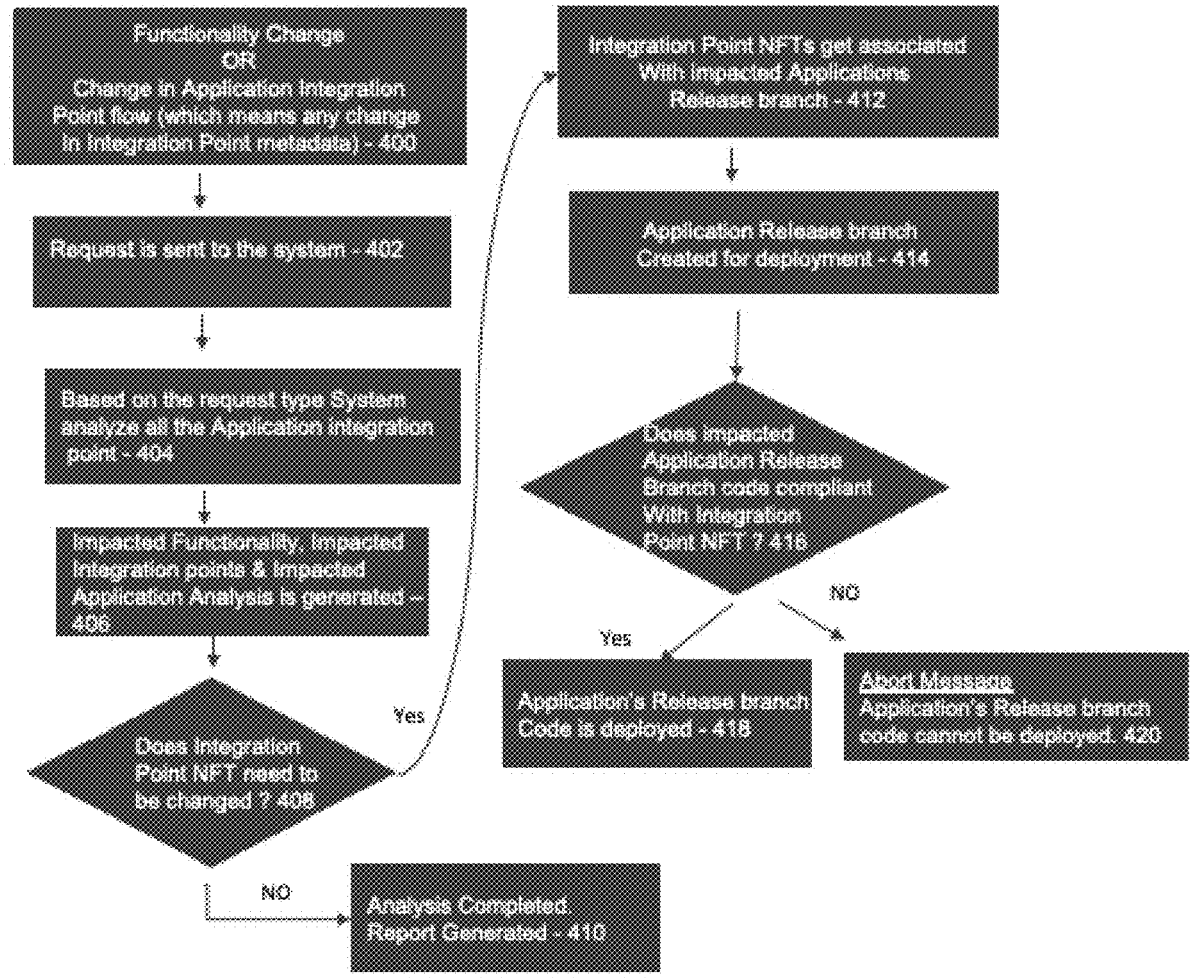
FIG. 4 depicts impact analysis and release integration as well as functionality change/change in integration point flow (i.e., any change in integration point metadata) in accordance with one or more aspects of this disclosure as they relate to integration of enterprise applications.

By way of non-limiting disclosure, FIG. 4 depicts impact analysis and release integration as well as functionality change/change in integration point flow (i.e., any change in integration point metadata) in accordance with one or more aspects of this disclosure as they relate to integration of enterprise applications.

In 400 a functionality change, or a change in the application integration point flow occurs, which means that any change in integration point metadata triggers the step. In 402, a request is sent to the system. Based on the request type, the system analyzes all the application integration points in 404. In 406, impacted functionality, impacted integration points, and impacted application analysis are generated. Next, in 408, a determination is made as to whether and integration point NFT needs to be changed. If not, the analysis is completed, and a report is generated in 410. Otherwise, if the answer is yes, then the process proceeds with step 412 in which the integration point NFTs get associated with impacted applications or release branch. In 414, the application release branch is created for deployment. Next, a determination is made in 416, as to whether the impacted application release branch code is compliant with the integration point NFT. If yes, the applications release branch code is deployed in 418. Otherwise, an error condition exists, and an abort message is generated stating that the applications release branch code cannot be deployed in step 420.

More specifically with respect to impact analysis and release integration, the effect of impact can be caused by one of two factors. Any change in the integration points means that the functionality has changed, or the implication integration point has changed. Because when it comes to changing the functionality of an enterprise or any other organization, usually they have actually defined where it must change. As a result of the functionality change, the integration point has shifted.

It could be technology driven that instead of using SOAP, developers should now use JSON because of industry structure, or Kafka because of some volume related performance, etc.

As a result, the application integration point must be changed. The trigger point for this one could be a change in functionality or a change in the application integration point flow, which means any change in the integration point metadata.

The request is then sent in that scenario as well because impact analysis is being evaluated That functionality alters what is output. Now that NFT is in place, and the change has been made, the issues of what else needs to be changed, and what systems are affected can be addressed.

NFTs, systems, and applications are all present. As a result, one request is sent to the system. The system now analyzes all application integration points based on the request type. The affected functionality, integration point, and application analysis are then generated. In that scenario, it determines whether, for example, the integration point NFT should be changed.

If a change is required, this flow can continue as depicted; otherwise, the analysis is completed, and a report is generated for this functionality. And it happens from time to time whenever an enterprise makes a change.

As a result, the enterprise can then attempt to determine whether it is actually affected or if it is a problem with the current system. Also, this issue can be accommodated with no changes sometimes because it could be minor UI-related matters or other non-substantial concerns. So, in general, the analysis is complete, and before making any changes, the enterprise likely will conduct an analysis and generate a report.

If the integration point NFT is associated with the affected application in terms of release, this means that the changes that are required are associated with the release branch. The application's release branch is then created. As a result, even before deployment in the DevOps system, the release bond must be created. Then it will identify with the ecosystem of that NFT that does affect the application release branch or NFT point compliance. If no, the application release branch cannot be deployed; if yes, the application release code is deployed.

To elaborate on this point, suppose X has been defined, and the enterprise has two applications in February. One has defined that changes will be made in February, and developers must follow that one.

It is now connected to the NFTs that are present. Now, Application A, Application B, and Application C are the three applications that have been integrated with application 1.

In that scenario, when Application 1 is published in February, the change will be made, so other applications must adhere to that time frame. So these Applications A, B, and C are actually related to them. So, when the release branch for Applications A, B, and C is created, it will crosscheck whether there is compliance with and adherence to the Application 1 integration point or not. If it is not in compliance, the DevOps environment will prevent release of the branch that is not abiding. Only after being brought into compliance with the application integration point NFT will the release branch be deployed.

Figure 5:
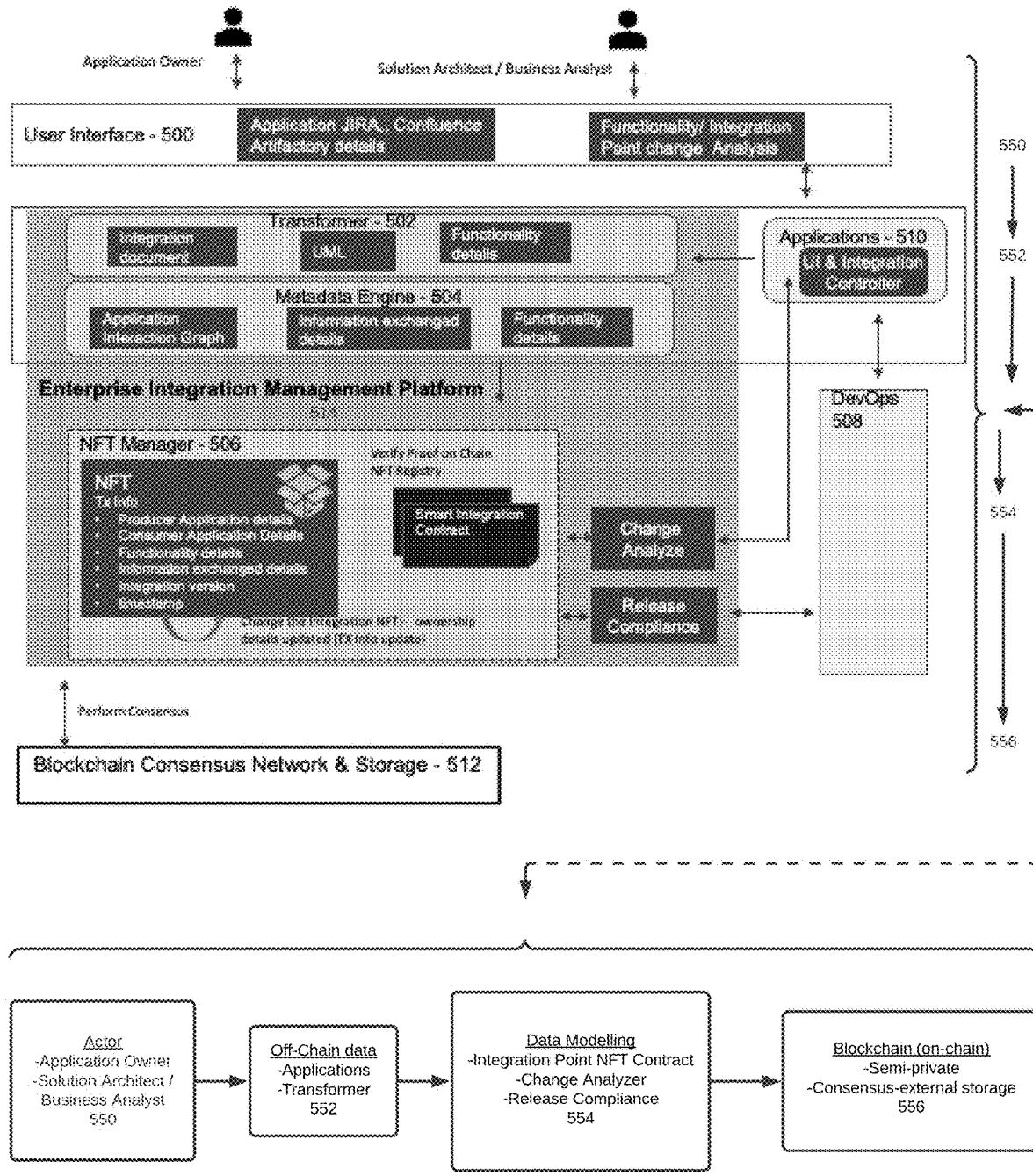
FIG. 5 depicts an architecture, functional, flow diagram showing sample interactions, interfaces, steps, functions, and components in accordance with one or more aspects of this disclosure as they relate to integration of enterprise applications.

By way of non-limiting disclosure, FIG. 5 depicts an architecture, functional, flow diagram showing sample interactions, interfaces, steps, functions, and components in accordance with one or more aspects of this disclosure as they relate to integration of enterprise applications. As illustrated, the architecture is separated in layers of actors 550, off-chain data, data modeling, and blockchain.

The actors are the application owners or solution architect/business analysts. They onboard the application, which then must be configured for use in the NFT environment. This is accomplished via a user interface 500 or the like, and which will utilize application JIRA and confluence artifactory details as well as functionality integration point change analysis in the UI and integration controller for applications 510.

The UI and integration controller provides the application to transformer 502. This is where the integration documents, UML, and functionality details are transformed into a form that can be utilized. A metadata engine generates an application interaction graph, information exchange details, and functionality details that are provided to an enterprise integration management platform 514. The metadata engine generates this complete metadata.

The enterprise integration management platform 514 includes an NFT manager 506, which is responsible for managing all NFT creations, making any changes to the NFTs, updating ownership details, etc. The NFT manager is also responsible for all NFT-related issues. Each token can include, inter alia, producer application details, consumer application details, functionality details, information exchanged details, integration version information, timestamps, etc. The NFT manager will also verify proofs on a blockchain NFT registry with smart contract integration based on analysis of any changes made to the application as well as whether release comply with the requirements. Accordingly, the enterprise integration management platform 514 is coupled to a blockchain consensus network and storage 512.

As a result, change analysis will take place. It will check with the NFT manager, try to determine what affected applications are present based on the request for the impact analysis, and then perform all necessary analysis and send the report.

Now, if a change is required, release compliance is attached to it. So it is tightly coupled with DevOps 508. An application is only able to deploy when the system reports that DevOps has confirmed that it complies with the NFT with which it is integrating.

Figure 6:
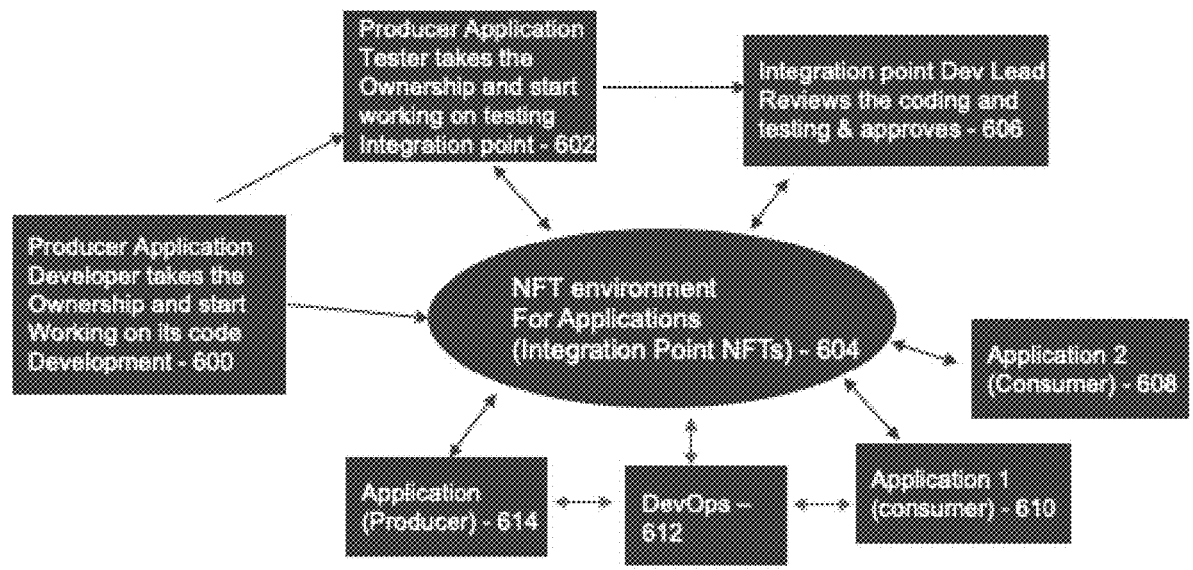
FIG. 6 depicts additional technical diagrams with NFT implementation and flow functionality in accordance with one or more aspects of this disclosure as they relate to integration of enterprise applications.

By way of non-limiting disclosure, FIG. 6 depicts additional technical diagrams with NFT implementation and flow functionality in accordance with one or more aspects of this disclosure as they relate to integration of enterprise applications.

In 600, a producer application developer takes ownership and starts working on its code development. In 602, a producer application tester takes ownership and starts working on testing integration point(s). In 606, an integration point dev lead reviews the coding, and then testes and approves it. The foregoing is individually and collectively coupled to an NFT environment for applications in 604, which is a compilation of integration point NFTs stored in a blockchain. Interactions between various applications for consumers 608 and 610, DevOps 612, and producers 614 are depicted as well.

As shown in the diagram, the application that exposes its services to other applications is known as the Producer of the Integration Point, and the application that consumes the service of the Integration Point is known as the Consumer. The producer application defines the NFT that it owns and can be referred to by other consumer applications. Once the integration point NFT is defined, the producer and consumer application teams can work on development concurrently. Developer takes ownership of NFT and works on its code development once the producer NFT is defined and published in NFT Environment. When the development is finished, the Producer Application Tester takes ownership of NFT and completes the testing. The changes are reviewed and approved by the Integration Point NFT's Dev Lead. This approved NFT development is now being updated, and consumer applications are being launched. Consumer applications must complete development and testing by the Release date specified in Integration point NFT. When a release branch is deployed, it is checked with NFT to see if the code is Integration point NFT compliant.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

The invention claimed is:

1. A method for managing integration points in an enterprise environment utilizing non-fungible tokens, comprising the steps of:
    extracting, by an artificial intelligence (AI) transformer, integration point information for enterprise applications from unified modeling language (UML) software models, integration documents, functionality descriptions, integration protocols, and data exchange patterns, said integration point information in an unstructured format;
    parsing, by a metadata engine, the integration point information into a structured format;
    generating, by the metadata engine based on the integration point information, an application interaction graph and application integration metadata;
    transmitting, by the metadata engine to an enterprise integration management platform, the application interaction graph and the application integration metadata;
    generating, by a non-fungible token (NFT) manager based on the application interaction graph and the application integration metadata, integration point NFTs for each integration point for the enterprise applications, wherein each said integration point NFTs is a smart integration contract and is unique to each version of said enterprise applications, said integration point NFTs including:
    producer application details that exposes available services,
    consumer application details,
    information and data type details regarding what is exchanged for input and output for integration,
    functionality impact details,
    integration versioning details,
    release date details, and
    timestamps;
    storing, by a blockchain consensus network, the integration point NFTs in blockchain storage;
    detecting, by a change analyzer in the enterprise integration management platform, any changed application in any of said enterprise applications;
    performing, by the change analyzer based on the changed application and the integration point NFTs, an impact analysis for each said integration point for the enterprise applications to determine consequences resulting from the changed application;
    updating, by the NFT manager, the integration point NFTs based on the impact analysis;
    performing, by the blockchain consensus network, consensus processing on the integration point NFTs that were updated;
    storing, by the blockchain consensus network in the blockchain storage, the integration point NFTs that were updated if a consensus was reached during consensus processing;
    verifying, by a release compliance manager, that the changed application complies with the smart integration contract for the integration point NFTs; and
    preventing, by the release compliance manager, deployment of the changed application until compliance with the smart integration contract is verified.

2. The method of claim 1 wherein each of said enterprise applications has a primary NFT and a secondary NFT for each version change for each of said enterprise applications, said primary NFT and secondary NFT linked together.

* * * * *